United States Patent
Cochet et al.

(10) Patent No.: US 12,359,429 B2
(45) Date of Patent: Jul. 15, 2025

(54) PANEL FOR A FLOOR OR WALL AND METHOD FOR MANUFACTURING ONE SUCH PANEL

(71) Applicant: CARBON CAPTURE BUILDINGS GREENTECH, Beaurepaire (FR)

(72) Inventors: François Cochet, Barraux (FR); Laurent Noca, Hauterives (FR)

(73) Assignee: CARBON CAPTURE BUILDINGS GREENTECH, Beaurepaire (FR)

( * ) Notice: Subject to any disclaimer, the term of this patent is extended or adjusted under 35 U.S.C. 154(b) by 189 days.

(21) Appl. No.: 17/918,649

(22) PCT Filed: May 14, 2021

(86) PCT No.: PCT/EP2021/062898
§ 371 (c)(1),
(2) Date: Oct. 13, 2022

(87) PCT Pub. No.: WO2021/229088
PCT Pub. Date: Nov. 18, 2021

(65) Prior Publication Data
US 2023/0134719 A1    May 4, 2023

(30) Foreign Application Priority Data

May 13, 2020    (FR) ...................................... 2004731

(51) Int. Cl.
*E04C 2/288*    (2006.01)
*B32B 3/26*    (2006.01)
*B32B 7/02*    (2019.01)
*B32B 7/022*    (2019.01)
*B32B 7/08*    (2019.01)
(Continued)

(52) U.S. Cl.
CPC .............. *E04C 2/288* (2013.01); *B32B 3/266* (2013.01); *B32B 7/02* (2013.01); *B32B 7/022* (2019.01);
(Continued)

(58) Field of Classification Search
CPC ... E04C 2/288; E04C 2/34; E04C 2/46; E04C 2/50
See application file for complete search history.

(56) References Cited

U.S. PATENT DOCUMENTS

| 4,632,796 | A | | 12/1986 | Moulet |
| 5,324,469 | A | * | 6/1994 | Walter .................... C04B 18/28 |
| | | | | 264/234 |

(Continued)

FOREIGN PATENT DOCUMENTS

| CH | 176841 A | 5/1935 |
| CN | 105667005 A | 6/2016 |

(Continued)

OTHER PUBLICATIONS

Jul. 27, 2021 Search Report issued in International Patent Application No. PCT/EP2021/062898.

*Primary Examiner* — Brent W Herring
(74) *Attorney, Agent, or Firm* — Oliff PLC

(57) ABSTRACT

A panel for a floor or wall includes a first board, a second board and an intermediate third board fitted between the first and second boards, the intermediate third board including a thermal insulating material, the first and second boards including a material that is able to harden in which organic elements of vegetal origin are sunk.

14 Claims, 7 Drawing Sheets

(51) Int. Cl.
*B32B 13/04* (2006.01)
*E04B 2/00* (2006.01)
*E04B 5/02* (2006.01)
*E04C 2/34* (2006.01)
*B32B 5/02* (2006.01)
*B32B 13/12* (2006.01)
*B32B 13/14* (2006.01)
*B32B 27/30* (2006.01)
*B32B 27/40* (2006.01)

(52) U.S. Cl.
CPC .............. *B32B 7/08* (2013.01); *B32B 13/04* (2013.01); *E04C 2/34* (2013.01); *E04C 2/46* (2013.01); *E04C 2/50* (2013.01); *B32B 5/02* (2013.01); *B32B 13/12* (2013.01); *B32B 13/14* (2013.01); *B32B 27/302* (2013.01); *B32B 27/40* (2013.01); *B32B 2260/02* (2013.01); *B32B 2260/04* (2013.01); *B32B 2262/067* (2013.01); *B32B 2305/026* (2013.01); *B32B 2305/30* (2013.01); *B32B 2607/00* (2013.01)

(56) References Cited

U.S. PATENT DOCUMENTS 8,966,845 B1 * 3/2015 Ciuperca .................. B32B 5/18
52/309.12

2013/0125487 A1 * 5/2013 Power .................. E04B 1/7076
52/302.3
2016/0069067 A1 * 3/2016 Ciuperca .............. E04B 1/7633
52/309.8
2021/0372147 A1 12/2021 Beaumont
2023/0134719 A1 * 5/2023 Cochet ..................... B32B 7/02
52/794.1

FOREIGN PATENT DOCUMENTS

| | | |
|---|---|---|
| DE | 1 571 406 A1 | 12/1970 |
| DE | 35 29 619 A1 | 2/1987 |
| DE | 203 14 143 U1 | 1/2005 |
| DE | 20 2005 021 203 U1 | 6/2007 |
| DE | 10 2014 208 294 A1 | 11/2015 |
| EP | 1 602 789 A1 | 12/2005 |
| EP | 2 025 823 A1 | 2/2009 |
| FR | 2 524 528 A1 | 10/1983 |
| FR | 2 567 942 A1 | 1/1986 |
| FR | 2 570 738 A1 | 3/1986 |
| FR | 2 835 272 A1 | 8/2003 |
| FR | 2 909 695 A1 | 6/2008 |
| FR | 2 950 910 A1 | 4/2011 |
| FR | 2 986 249 A1 | 8/2013 |
| FR | 3 072 701 A1 | 4/2019 |
| FR | 3 084 382 A1 | 1/2020 |

* cited by examiner

PANEL FOR A FLOOR OR WALL AND METHOD FOR MANUFACTURING ONE SUCH PANEL

BACKGROUND OF THE INVENTION

The invention relates to panels for a floor or a wall, and more particularly for a wall of a building.

STATE OF THE ART

At the present time, different structures exist for erecting a construction such as a house or a building. In conventional manner, prefabricated hollow concrete blocks, or bricks, are used assembled with mortar as construction of the wall is progressively performed. But these walls have to be assembled on site and these methods are lengthy to implement.

Prefabricated panels made from wood or metal can be manufactured, but they do not present the properties of concrete. For example, French Patent application FR2986249 can be cited disclosing an insulating load-bearing wall formed by a rigid polyurethane board comprised between two wooden panels, the board being assembled by lamination and pressing. French Patent application FR3084382 can be cited disclosing a panel designed for erecting outer wall systems comprising a board having at least two superposed layers and comprising an alternation of wooden slats and insulating strips.

Prefabricated concrete panels can also be used to make walls from one or two panels, but these panels are heavy to transport and require a large quantity of concrete. Furthermore, when a wall is made with two concrete panels, the space between the panels is filled with a Z-shaped metal armature to ensure the strength of the panels thus making the whole assembly very bulky.

French Patent applications FR2567942 and FR3072701 can be cited disclosing a sandwich wall panel formed by an insulating panel sandwiched between an inner wall and an outer wall, the walls being made from concrete. Furthermore, French Patent application FR2835272 discloses an insulating wall comprising an insulating panel comprised between two concrete panels, the panel being reinforced by rods sunk into the wall and passing through the insulating panel.

French Patent application FR2909695 can further be cited disclosing a composite structure for erecting walls, panels or slabs, comprising a support armature formed by pieces of wood and coated with a binding product composed of cement or lime mixed with wood reinforcement particles. However, these walls do not provide sufficient thermal insulation.

French Patent application FR2950910 can also be cited disclosing a panel for erecting a construction comprising two parallel uprights coated in a binder made from cement and shredded wood. The panel further comprises two grooves respectively located on two opposite surfaces of the panel to house assembly parts designed to be secured to the uprights. But such a panel is complex to manufacture and requires the use of at least two uprights to reinforce the panel. In addition it does not provide sufficient thermal insulation.

French Patent application EP1602789 can also be cited disclosing a wall panel comprising a polystyrene panel comprised between two panels comprising glass fibre mesh mixed with cement. But these panels have to be manufactured on site and cannot be transported.

European Patent application EP2025823 can further be cited disclosing a panel with several layers made by compaction, the layers having densities that vary alternately between a low density and a high density. Furthermore, the layers are made from a material comprising wood chips mineralised by cement or a magnesite binder. In particular, the layers are made one after the other, compacting each layer to obtain the required density. But such a panel can be heavy and difficult to transport.

It is known from document CH176841 to form a porous slab made from light concrete such as an aerated concrete. The porous slab is covered on its two opposite surfaces by a panel made from fibrous material, for example a long-fibre wood wool. Such a formation does not have any load-bearing capacity and the mechanical performances are such that the structural element presented has to be added to the structure which tends to increase the thickness of the walls or floors.

Document DE1571406 discloses a lightweight construction panel formed by a rigid foam board the two opposite main surfaces of which are covered by a mixture of wood chips and cement. The mixture of wood chips and cement is known to come detached from the foam board when the shear forces increase.

To enhance the shear strength, it is proposed to bind the rigid foam board with the panels made from the mixture of wood chips and cement by means of a hardened epoxy resin layer.

Document FR2570738 discloses a sandwich panel formed by an insulating polystyrene board that separates two strong facings made from wood concrete.

The insulating polystyrene board defines dovetail-shaped recesses on two opposite faces to enable the two strong facings to be cast. Grooves are formed in the side walls of the polystyrene layer to assemble several panels.

SUMMARY OF THE INVENTION

One object of the invention consists in remedying these shortcomings, and more particularly in providing means for making a floor or a wall of a building that improves the thermal insulation without penalising the breathability of the panel and its mechanical strength.

Another object consists in providing means for making a panel designed to form a floor or a wall that can be prefabricated and transported from the prefabrication site to the construction site of a building.

According to one feature of the invention, a panel for a floor or wall is proposed comprising a first board, a second board and an intermediate third board inserted between the first and second boards, the intermediate third board comprising a thermal insulating material.

The first and second boards comprise a material that is able to harden in which organic elements of vegetal origin are sunk.

A panel having a thermal insulation is thus provided for construction of buildings.

The panel can comprise a fixing means configured to fasten the boards of the panel to one another.

A panel is thus provided with boards that are solidly secured to one another.

Such a panel can then be manufactured in plant and transported to site for construction of a building.

The fixing means can comprise a screw passing through the first board and the intermediate third board and partially screwed into the second board.

The material that is able to harden can comprise a hydraulic binder.

The organic elements of vegetal origin can be wood elements.

The panel can comprise a spacer fitted in contact against the first and second boards.

An air space can be formed between the intermediate third board and the second board.

A through opening can be formed in the panel and the panel comprises an edge piece situated at the periphery of the through opening, the edge piece comprising the same material as that of the first and second boards.

According to another feature, a method for manufacturing a panel as defined above is proposed, comprising assembly of an intermediate third board comprising a thermal insulating material between a first board and a second board, the first and second boards comprising a material that is able to harden in which organic elements of vegetal origin are sunk.

The method can comprise, after assembly, screwing a screw passing through the first board and the intermediate third board and screwed partially into the second board.

According to one embodiment, assembly comprises provision of the first and second boards and placing of the intermediate third board between the first and second boards.

According to another embodiment, assembly comprises manufacture of the first board, manufacture of the intermediate third board on the first board and manufacture of the second board on the intermediate third board.

Assembly can comprise placing of a spacer in contact against the first and second boards.

DESCRIPTION OF THE DRAWINGS

Other advantages and features will become more clearly apparent from the following description of the embodiments and implementation modes of the invention given for non-restrictive example purposes only and represented in the appended drawings, in which.

Figure 7:
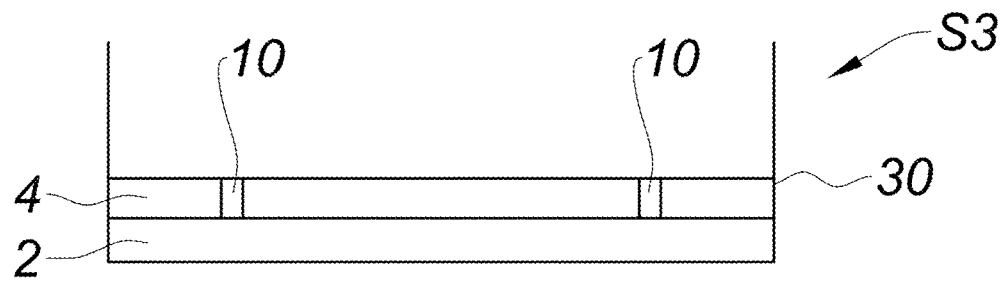
Figure 8:
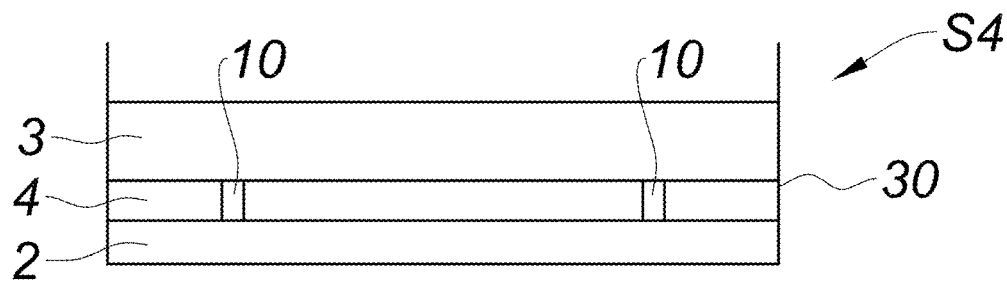
Figure 9:
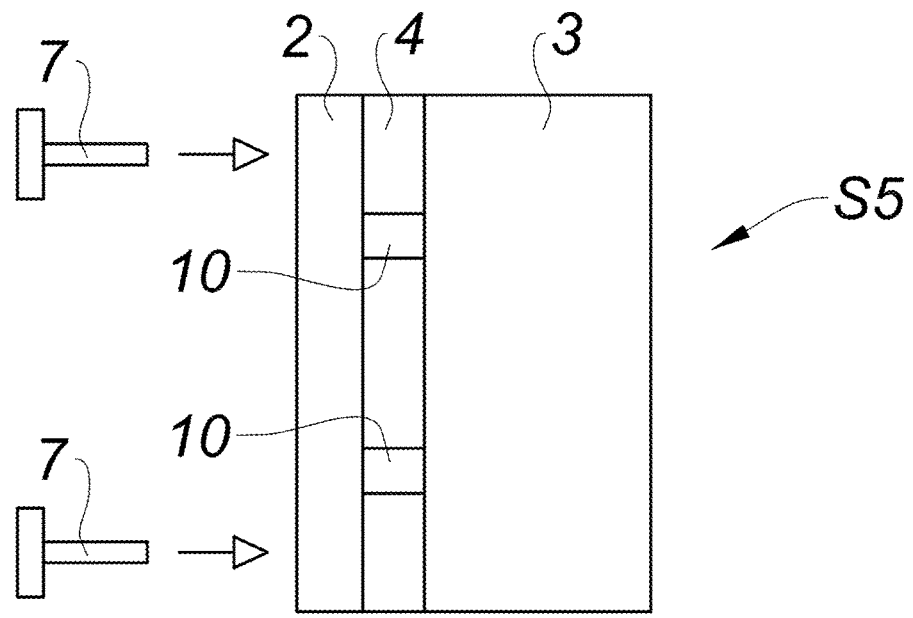
Figure 10:
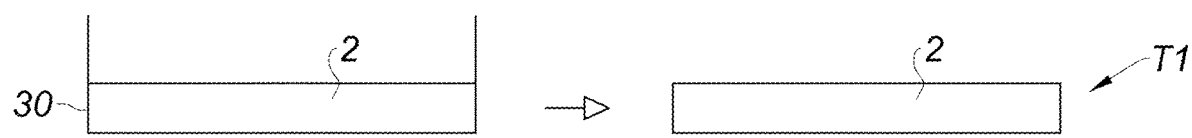
Figure 11:
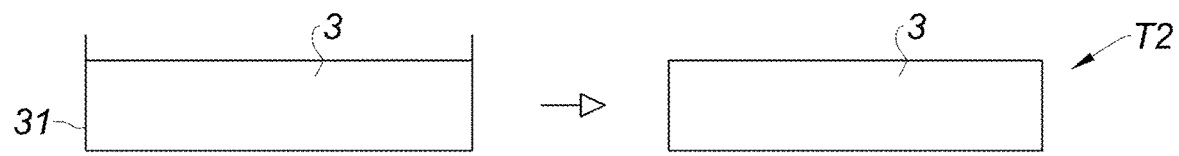
Figure 12:
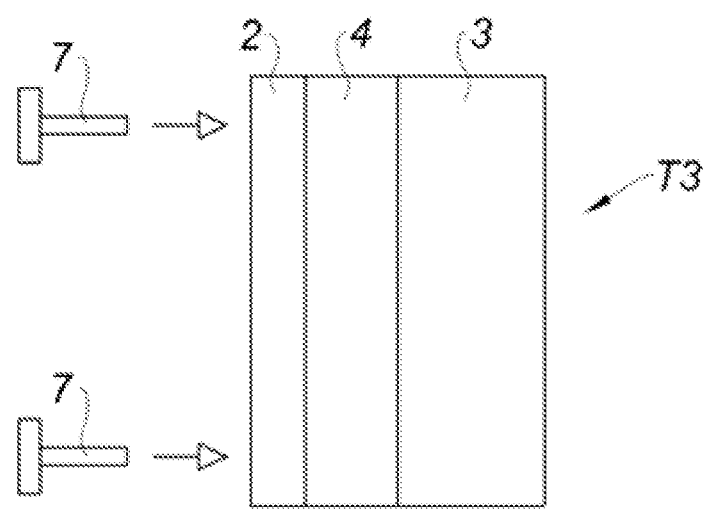

la FIG. 7 schematically illustrates a third step of the method for manufacturing the panel;

FIG. 8 schematically illustrates a fourth step of the method for manufacturing the panel;

FIG. 9 schematically illustrates a fifth step of the method for manufacturing the panel;

FIG. 10 schematically illustrates a first step of another embodiment of a method for manufacturing a panel according to the invention;

FIG. 11 schematically illustrates a second step of the method for manufacturing the panel; and FIG. 12 schematically illustrates a third step of the method for manufacturing the panel.

DETAILED DESCRIPTION

In FIGS. 1 to 4, a panel 1 for a floor or wall of a building has been represented. In particular, the panel 1 is designed for constructing a front wall or a partition, i.e. the panel 1 is globally parallelepipedic in shape. The panel 1 is designed to be placed vertically with respect to the ground.

In general manner, the panel 1 comprises a first board 2, an inner second board 3 and an intermediate third board 4. What is meant by board is a part presenting a length and width that are greater than its height. In general manner, a board is globally parallelepipedic in shape. The first and second boards 2, 3 are preferentially single-piece boards. The third intermediate board 4 can be single-piece or comprise several pieces in sheet form superposed on one another. Different variants are possible, the pieces being superposed either in the heightwise direction of the panel 1 or in the longwise direction of the panel 1 or possibly a combination of the two. The third intermediate board 4 is placed between first and second boards 2, 3. The third intermediate board 4 comprises a thermal insulating material. For example, the material comprises or is made from polyurethane, polystyrene, or preferably wood wool. A thermal insulating material having a thermal conductivity less than 0.07 Watt/(metre·Kelvin), in particular a thermal conductivity comprised between 0.02 and 0.04 Watt/(metre·Kelvin), will more particularly be used. It is particularly advantageous for the intermediate board to have a thermal resistance that is at least equal to 60% of the thermal resistance of the panel. It is also advantageous for the thermal resistance of the intermediate board to be higher than or equal to 1.5 Watt/(metre·Kelvin).

More particularly, the first and second boards 2, 3 comprise a material that is able to harden in which organic elements of vegetal origin 5 are sunk. An organic element of vegetal origin can be wood, straw, cellulose, rice husks, bamboo chips, hemp or cork. An organic element comprises carbon. Preferentially, the material that is able to harden comprises a hydraulic binder, i.e. a binder that reacts with water in order to harden. In other words, to obtain the material that is able to harden, the hydraulic binder is mixed with water. When the material dries, it hardens by chemical reaction between the binder and water. The binder is for example a cement or lime. For example, the material that is able to harden is a mortar. The mortar is made from cement or lime and can comprise sand or not. More particularly, the material obtained from a mortar in which wood elements 5 are sunk is called wood-concrete. In preferential manner, the first board 2 is formed from a first mixture that comprises at least 50% volume of vegetal material particles. Advantageously, the second board 3 is formed from a second mixture that comprises at least 50% volume of vegetal material particles. Such a vegetal material particle content makes it easier to obtain a perspirant board.

Preferentially, the organic elements of vegetal origin 5 are wood elements. The wood elements can be wood chips having a length of less than 75 mm, preferentially comprised between 10 and 75 mm, and even more preferentially between 20 and 60 mm. For example, with respect to the total mass of the wood elements, the wood-concrete comprises between 80% and 95% of wood elements having a length comprised between 10 and 60 mm, preferably between 20 and 60 mm. By using first and second boards made from wood-concrete that contain between 80% and 95% of wood elements with respect to the total mass of the wood elements, it is easier to form perspirant boards 2 and 3. In other words, first and second boards 2, 3 are airtight but they are permeable to water vapour. The length of the wood elements is smaller than the thickness of the first board 2 and than the thickness of the second board 3. The wood elements are sunk in the concrete, that means the wood elements are fully coated by the concrete with the possible exception of the wood particles located at the surface of first panel 2 and of second panel 3. The use of perspirant first and second boards 2, 3 makes it possible to form a panel that presents a good thermal resistivity without however making the room unpleasant by blocking the water vapour in the room.

More particularly, these wood chips have a thickness comprised between 1 mm and 5 mm. When wood chips having a length comprised between 20 and 60 mm are used, microcavities are obtained at the surface of board 2, 3 due to the fact that the concrete coats the wood chips. Such microcavities enhance the adhesion of the third intermediate board 4 to the two wood-concrete boards 2, 3.

To form a perspirant panel, a breathable intermediate board 4 has to be used. The intermediate board 4 is porous. It is particularly advantageous to use an intermediate board 4 made from wood wool or any other thermally insulating and porous material preferably having an organic material base.

According to a variant, the thickness, i.e. the height, of the first and second boards 2, 3 are different. A panel 1 is thus provided the thicker board 2, 3 of which provides the panel 1 with a load-bearing property. The less thick board is designed to withstand temperature variations and will be able to expand limiting the mechanical stresses generated on the third intermediate board 4. Preferentially, the less thick board is designed to be placed on the outside of the building. According to yet another variant, the length and width of the first board 2, in particular the board designed to be placed on the outside of the building, can be smaller than the length and width of the second board 3. In this case, expansion of the first board 2 is facilitated with respect to the second board 3. It is preferable for the inner board that provides a large mechanical strength to have a thickness at least equal to 15 cm. It is also preferable for the outer board to have a thickness at least equal to 7 cm to ensure a minimum strength and a sufficient thermal resistance. It is preferable for the thicker board to have a thickness that is at least twice the thickness of the less thick board.

It is also advantageous to provide for the thicker board to have a different composition from the composition of the less thick board. The difference of composition can be a difference of vegetal material particle content.

When the panel forms a wall, the less thick board is placed on the outside to block the heat flux. The thicker board is placed on the inside and provides a mechanical support for the structure to be formed. The outer board is generally at a different temperature from the inner board which gives rise to the appearance of stresses between the first board 2 and the second board 3 on account of the temperature changes that exist during the day and throughout the year. For example, the inner board is sufficiently thick to support a floor, a roof and/or an upper storey. The inner board procures mechanical performances enabling a wall to be formed supporting a roof or an upper storey, i.e. better mechanical performances than those of a simple partition. To protect thermally the insulating intermediate layer 4 while at the same time providing a high thermal resistance in the first direction passing through the three boards, it is advantageous to install the intermediate board between the first board 2 and the second board 3. In order to form a panel of limited thickness that is easy to implement, it is advantageous to provide a single-piece panel with the inner board providing the mechanical strength of the structure and the outer board providing protection of the intermediate layer 4. The outer board can be formed with a mixture containing finishing and protection additives that are absent from the mixture forming the inner board. The inner board can be at least twice as thick as the outer board. The inner board can have a vegetal material particle content that is lower than the content of the outer board.

In order not to hamper the differential thermal expansion between the two boards 2 and 3, it is advantageous for the fixing means between the two boards 2 and 3 to ensure formation of a single-piece panel thereby making handling easily without however impeding expansion which would result in increased damage to the panel. It is particularly advantageous for the inner board which is thicker not to impede or to impose thermal expansion of the outer board.

It is particularly advantageous for intermediate board 4 not to be mechanically fixed at the same time to the first board 2 and to the second board 3. Intermediate board 4 can be fixed only to the inner board or only to the outer board. It is preferable for intermediate board 4 to be fixed only to the inner board. It is also advantageous to have an intermediate board 4 having a Young's modulus that is lower than or equal to 50% of the Young's modulus of the inner or outer board on which it is fixed so as not to impede thermal expansion.

In another embodiment, intermediate board 4 is not fixed directly either to the inner board or to the outer board. Intermediate board 4 is only fixed to fixing means 6 which perform securing of the outer board with the inner board.

In yet another embodiment, intermediate board 4 is fixed to the inner board and to the outer board. Intermediate board 4 has a Young's modulus that is less than 50% preferably less than 30% of the Young's modulus of the inner board and of the outer board in directions perpendicular to the first direction so that intermediate board 4 transmits little or no force from the inner board to the outer board and vice versa. In advantageous manner, the ratio of the Young's modulus of intermediate board 4 over the Young's modulus of the inner board is less than $\frac{1}{5}$, preferably less than $\frac{1}{10}$. It is further possible to provide for the value of the breaking strength of the intermediate board to be lower than the force applied by the less thick board when the panel is only supported by the thicker board, in the absence of fixing means between the first board 2 and the second board 3. In other words, intermediate board 4 does not have a sufficient strength to ensure the mechanical cohesion between boards 2 and 3.

It is particularly advantageous to have a panel having load-bearing properties as this avoids having to associate a load-bearing structure and an insulating structure. It is possible for the panel to be consolidated by several additional load-bearing parts, for example a reinforced concrete girder. The inner board has a sufficient thickness to present a strength that is compatible with formation of a wall able to support a ceiling or an additional storey.

Advantageously, the panel 1 comprises fixing means 6 configured to fasten boards 2 to 4 of the panel 1 to one another. Preferably, the fixing means 6 comprise one or more screws 7 passing through the first board 2 and the third intermediate board 4 and screwed partially into the second board 3. Fixing means 6 therefore enhance the strength of the assembly of three boards 2 to 4. Boards 2, 3 made from wood-concrete are particularly suitable for receiving a screw 7. It is in fact difficult in conventional manner to screw into traditional concrete and it is necessary to use wall plugs to fasten the screws and to use a hammer drill to make a preparatory hole in traditional concrete to place the wall plug. On the contrary, it is possible to screw easily and directly into wood-concrete, for example by means of a screwdriver or an electric driver, without using wall plugs or a hammer drill. The screws 7 enable boards 2 to 4 to be secured to one another by clamping. Advantageously, when the screws 7 are inserted, a progressive clamping force is generated enhancing the adhesion between the third intermediate board 4 and first and second boards 2, 3.

The use of a few screws enables the first board 2 to be fastened with the second board 3 to form a single-piece panel facilitating handling of the panel. The use of a few screws securing the first board 2 with the second board 3 enables a single-piece panel to be achieved easily without however preventing differential expansion between the two boards. On the contrary, the technical solution proposed in the document FR2570738 is not suitable. The polystyrene layer joins the two facing boards continuously so that a differential expansion between the two will generate a set of mechanical stresses in the different layers. Either the polystyrene layer cracks resulting in the two facing boards being detached from one another, or at least a part of the dove-tails cracks resulting in one of the facing boards dropping. An identical problem arises for the panel described in the document DE1571406 that proposes to use an epoxy resin layer to fix the wood-concrete facing layer onto the rigid foam. The same is the case when the central layer of the panel is made from aerated concrete securing the two facing boards and opposing differential expansion between the inner board and the outer board.

Fastening by screws can be replaced by another type of punctiform fastening.

Figure 1:
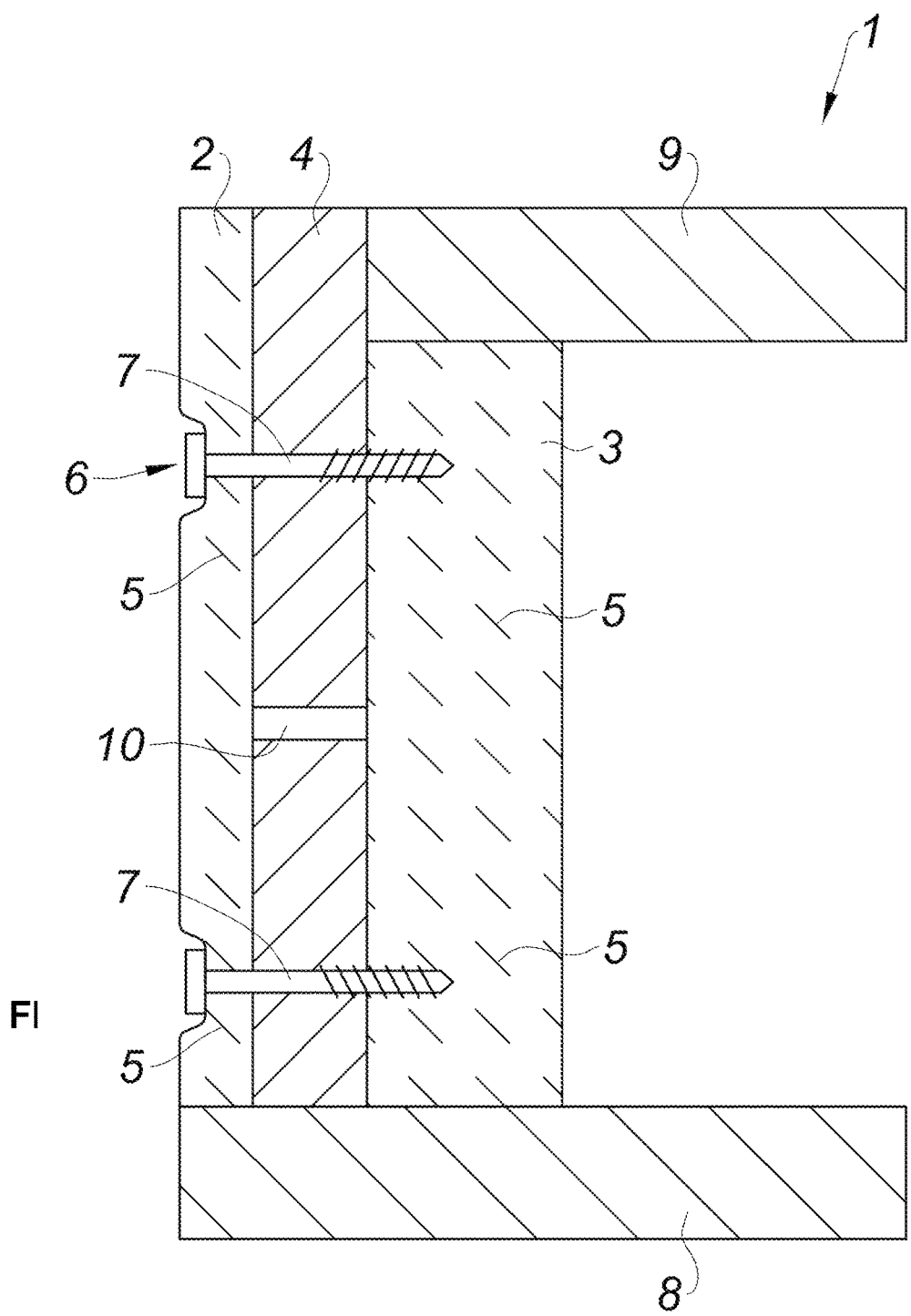
FIG. 1 schematically illustrates a cross-sectional view of an embodiment of a panel according to the invention.

In FIG. 1, an embodiment of a panel 1 intended for constructing a wall has been illustrated. The panel 1 rests on a slab 8 placed horizontally on the ground. The panel 1 is placed vertically on the slab 8. Furthermore, the height of the second board 3 can be different from that of the first board 2. In this case another slab 9, called top slab, can be placed on the second board 3.

Advantageously, the panel 1 comprises a spacer 10 fitted in contact against first and second boards 2, 3. The spacer 10 can be of cylindrical shape or have a profile in the shape of a "capital I". the spacer 10 protects the third intermediate board 4 from possible deformation. The spacer 10 is only fastened to one of the first board 2 or the second board 3 thus allowing differential expansion without adding an additional mechanical stress.

Figure 2:
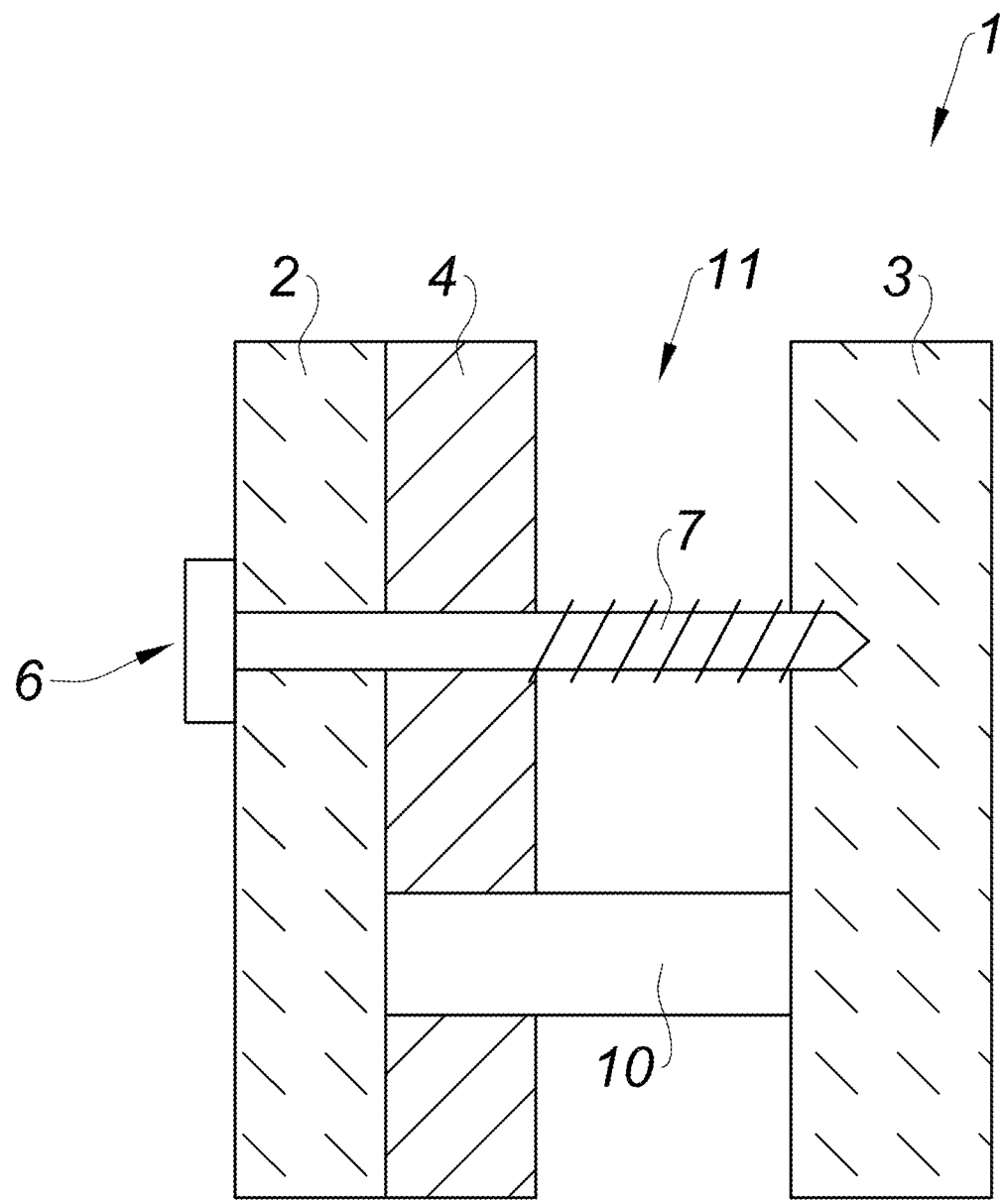
FIG. 2 schematically illustrates a cross-sectional view of another embodiment of a panel.

In FIG. 2, another embodiment of the panel 1 has been represented. In this other embodiment, an air space 11 is formed between the third intermediate board 4 and the second board 3. The thermal insulation of the panel 1 is thereby improved. Furthermore, air space 11 prevents water condensation and enables natural ventilation of the panel 1. The air space 11 protects the insulator against degradation by water.

Figure 3:
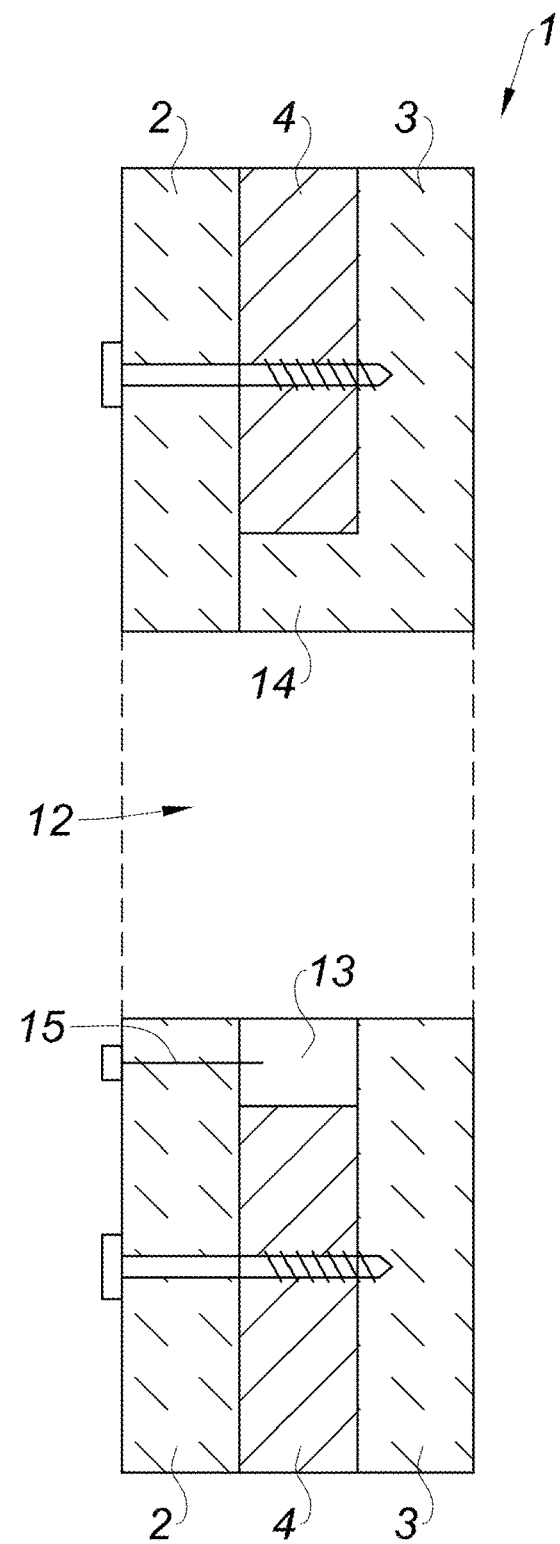
FIG. 3 schematically illustrates a cross-sectional view of another embodiment of a panel.
Figure 4:
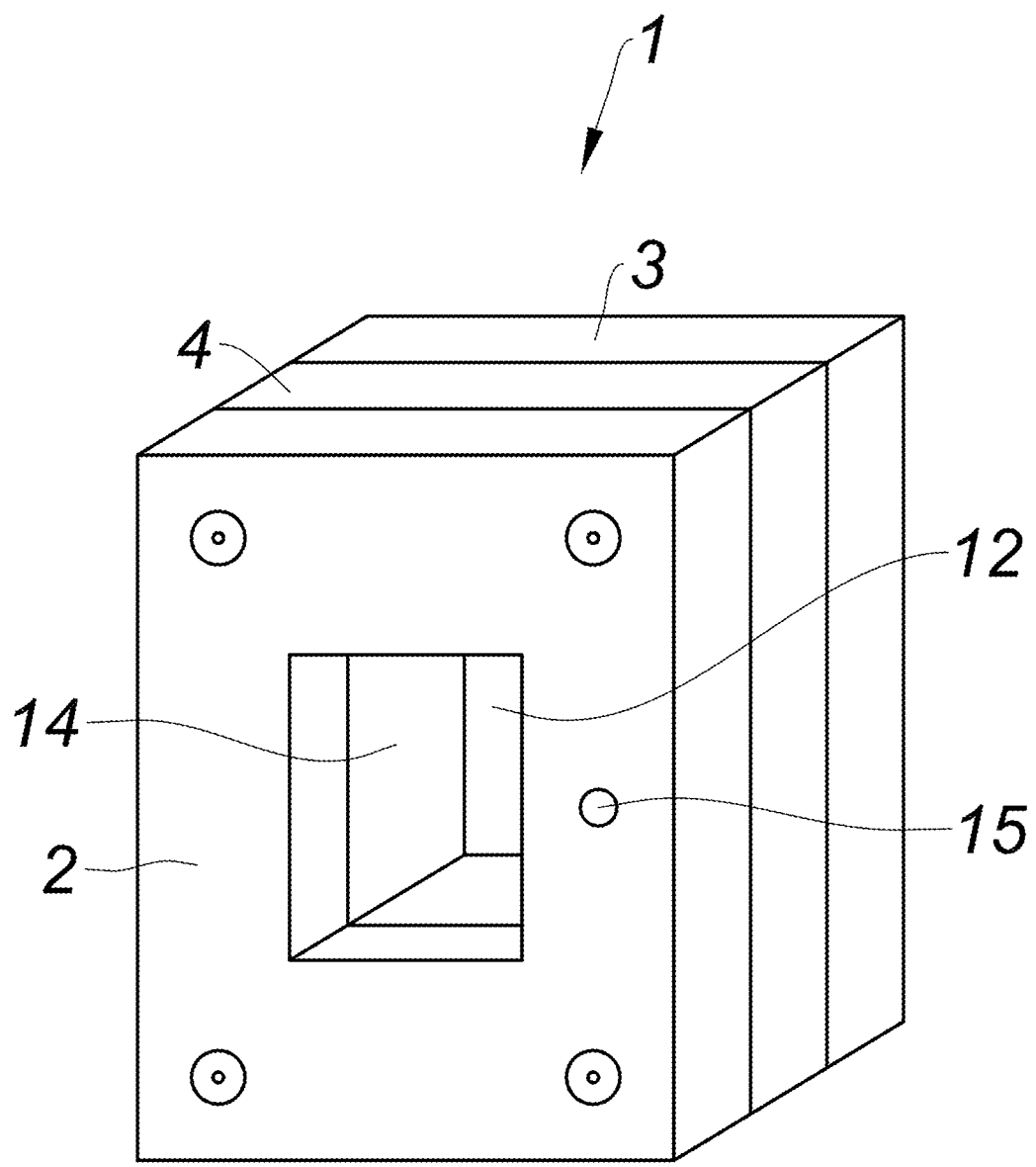
FIG. 4 schematically illustrates a front and perspective view of the panel illustrated in FIG. 3.
Figure 5:
FIG. 5 schematically illustrates a first step of an embodiment of a method for manufacturing a panel according to the invention.
Figure 6:
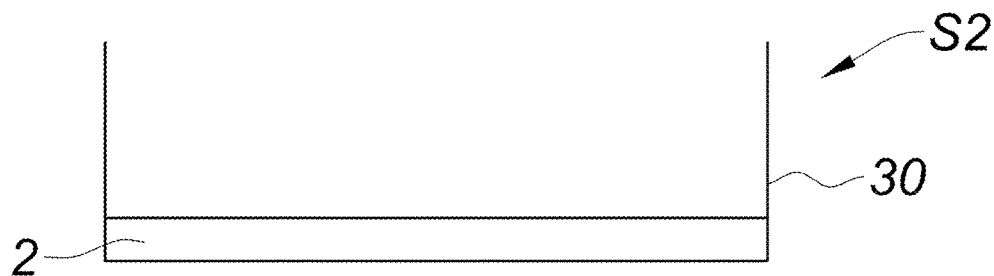
FIG. 6 schematically illustrates a second step of the method for manufacturing the panel.

In FIGS. 3 and 4, another embodiment of the panel 1 has been represented. An opening 12 can be formed in the panel 1, for example a through opening to house a casement, for example a window or a door. The panel 1 preferably comprises an edge piece 13, 14 made from the same material as that used to manufacture the first and second boards 2, 3. The material used to manufacture the first and second boards 2, 3 comprises the material that is able to harden in which the organic elements of vegetal origin 5 are sunk. Edge piece 13, 14 can be an additional part 13 distinct from the first and second boards 2, 3 and fixed to the panel 1 by means of an additional screw 15. As a variant, the edge piece 13, 14 is an extension 14 of a board 2, 3 placed at the edge of opening 12. The edge piece 14 formed by extension is an extension perpendicular to a longitudinal axis of board 2, 3. The edge piece 13 is preferentially fixed to one of the boards only.

A method for manufacturing the panel 1 is further proposed comprising assembly of the third intermediate board 4 comprising the thermal insulating material between the first board 2 and the second board 3. The first and second board 2, 3 can be manufactured by means of a mould 30, 31 in which the material that is able to harden comprising the organic elements of vegetal origin 5, in particular the wood elements, is injected.

According to a first embodiment, the first board 2 is made, and the third board 4 is then placed against the first board 2. Then the second board 3 is made in contact against the third board 4. As a variant, the second board 3 is made and the spacers 10 are then placed against the second board 3 through the third board 4. Then the first board 2 is placed against the third intermediate board 4, when the spacers 10 have a length equal to the thickness of the third intermediate board 4. As a variant, the spacers 10 have a greater length than the thickness of the third intermediate board 4, and the second board 3 is placed against the spacers to form the air space 11 between the third intermediate board 4 and the second board 3.

Advantageously, the method comprises screwing of a screw 7 passing through the first board 2 and the third intermediate board 4 and partially screwed into the second board 3. The screw or screws 7 keep the elements of the panel 1 assembled to one another. Fastening in this manner enables the panel 1 to be transported.

In FIGS. 5 to 9, the main steps of a first implementation mode of a method for manufacturing the panel 1 as defined above have been represented. The method comprises an assembly step of the boards 2 to 4 in order to produce the panel 1. Assembly comprises four main steps S1 to S4. In a first step S1, a mould 30 is provided designed to receive the material that is able to harden in which the organic elements of vegetal origin 5 are sunk, to obtain the first board 2. Then, in a second step S2, the material that is able to harden, in which the organic elements of vegetal origin 5 are sunk, is poured into the mould 30. Then, in a third step S3, the third intermediate board 4 is placed on the first board 2. Several spacers 10 can advantageously be fitted. The third intermediate board 4 can comprise one or more parts in board form. Then, in a fourth step S4, a material that is able to harden, in which the organic elements of vegetal origin 5 are sunk, is poured to form the second board 3 on the third intermediate board 4. The mould 30 is then removed to obtain the panel 1. It can be noted that boards 2 to 4 are secured to one another by means of the adhesion between the third intermediate board 4 and the first and second boards 2, 3. Adhesion is further strengthened by hardening of the material in contact with the third intermediate board 4. To enhance securing of boards 2 to 4 to one another, after assembly, the method can comprise a fifth step S5 in which the screws 7 are integrated through the first board 2, the third intermediate board 4 and partially into the second board 3 to fasten boards 2 to 4 to one another and form the panel 1.

In FIGS. 10 to 12, the main steps of a second implementation mode of a method for manufacturing the panel 1 as defined above have been represented. The method comprises an assembly step of boards 2 to 4 in order to produce the panel 1. Assembly comprises three main steps T1 to T3. In a first step T1, a first mould 30 is provided in which the material that is able to harden, in which the organic elements of vegetal origin 5 are sunk, is poured. Then, after the material has hardened, the first mould 30 is removed to obtain the first board 2. Then, in a second step T2, a second mould 31 is provided in which the material that is able to harden, in which the organic elements of vegetal origin 5 are sunk, is poured. The height of the second mould 31 can be greater than that of the first mould 30 in order to obtain the first and second boards 2, 3 having different thicknesses. Then, after the material has hardened, the second mould 31 is removed to obtain the second board 3.

Then, in a third step T3, the third intermediate board 4 is placed between the first and second boards 2, 3. Advantageously, before placing the third intermediate board 4, one or more spacers 10 can be placed in contact against one face of a board 2, 3, either the first or second board 2, 3. Then, after assembly, the method can comprise integration of the screws 7 through the first board 2, the third intermediate board 4 and partially into the second board 3 to fasten the boards 2 to 4 to one another and form the panel 1.

The invention that has been described in the foregoing enables the thermal insulation of buildings to be improved and facilitates construction thereof.

The invention claimed is:

1. A panel for a floor or wall comprising:
   a first board made from a first mixture comprising a mortar in which wood elements are sunk;
   a second board made from a second mixture comprising a mortar in which wood elements are sunk;
   an intermediate third board placed between the first and second boards in a first direction, the intermediate third board comprising a thermal insulating material, the intermediate third board being a perspirant board;
   punctiform fixing elements configured to fasten the first board, the second board and the intermediate third board to one another and to allow expansion of the first board with respect to the second board in a direction perpendicular to the first direction, the intermediate third board being fixed only to the first board or to the second board or joining the first board to the second board and deforming to allow expansion of the first board with respect to the second board in a direction perpendicular to the first direction;
   a spacer fitted in contact against the first and second boards;
   wherein with respect to the total mass of the wood elements, the first and second boards comprise between 80% and 95% of the wood elements having a length comprised between 10 and 60 mm, the wood elements being wood chips;
   wherein the first mixture and the second mixture comprise at least 50% volume of the wood element to form the first board and the second board from a perspirant material; and
   wherein the first board has a smaller thickness than the thickness of the second board in the first direction.

2. The panel according to claim 1, wherein the punctiform fixing elements comprise screws passing through the first board and the intermediate third board and screwed partially into the second board.

3. The panel according to claim 1, wherein an air space is formed between the intermediate third board and the second board.

4. The panel according to claim 1, wherein the wood elements are wood chips having a length of less than 75 mm.

5. The panel according to claim 1, wherein the second board is designed to receive a roof or an upper storey.

6. The panel according to claim 1, wherein the third intermediate board is only fixed to the second board.

7. A panel for a floor or wall comprising:
   a first board made from a first mixture comprising a mortar in which wood elements are sunk;
   a second board made from a second mixture comprising a mortar in which wood elements are sunk;
   an intermediate third board placed between the first and second boards in a first direction, the intermediate third board comprising a thermal insulating material, the intermediate third board being a perspirant board;
   punctiform fixing elements configured to fasten the first board, the second board and the intermediate third board to one another and to allow expansion of the first board with respect to the second board in a direction perpendicular to the first direction, the intermediate third board being fixed only to the first board or to the second board or joining the first board to the second board and deforming to allow expansion of the first board with respect to the second board in a direction perpendicular to the first direction;
   wherein with respect to the total mass of the wood elements, the first and second boards comprise between 80% and 95% of the wood elements having a length comprised between 10 and 60 mm, the wood elements being wood chips;
   wherein the first mixture and the second mixture comprise at least 50% volume of the wood element to form the first board and the second board from a perspirant material;
   wherein the first board has a smaller thickness than the thickness of the second board in the first direction; and
   wherein a through opening is formed and comprises an edge piece situated at a periphery of the through opening and comprising a same material as that of the first board or the second board.

8. A panel for a floor or wall comprising:
   a first board made from a first mixture comprising a mortar in which wood elements are sunk;
   a second board made from a second mixture comprising a mortar in which wood elements are sunk;
   an intermediate third board placed between the first and second boards in a first direction, the intermediate third board comprising a thermal insulating material, the intermediate third board being a perspirant board;
   punctiform fixing elements configured to fasten the first board, the second board and the intermediate third board to one another and to allow expansion of the first board with respect to the second board in a direction perpendicular to the first direction, the intermediate third board being fixed only to the first board or to the second board or joining the first board to the second board and deforming to allow expansion of the first board with respect to the second board in a direction perpendicular to the first direction;
   wherein with respect to the total mass of the wood elements, the first and second boards comprise between 80% and 95% of the wood elements having a length comprised between 10 and 60 mm, the wood elements being wood chips;
   wherein the first mixture and the second mixture comprise at least 50% volume of the wood element to form the first board and the second board from a perspirant material;
   wherein the first board has a smaller thickness than the thickness of the second board in the first direction; and
   wherein the second board has a wood element content lower than a wood element content of the first board.

9. A panel for a floor or wall comprising:
   a first board made from a first mixture comprising a mortar in which wood elements are sunk;

a second board made from a second mixture comprising a mortar in which wood elements are sunk;
an intermediate third board placed between the first and second boards in a first direction, the intermediate third board comprising a thermal insulating material, the intermediate third board being a perspirant board;
punctiform fixing elements configured to fasten the first board, the second board and the intermediate third board to one another and to allow expansion of the first board with respect to the second board in a direction perpendicular to the first direction, the intermediate third board being fixed only to the first board or to the second board or joining the first board to the second board and deforming to allow expansion of the first board with respect to the second board in a direction perpendicular to the first direction;
wherein with respect to the total mass of the wood elements, the first and second boards comprise between 80% and 95% of the wood elements having a length comprised between 10 and 60 mm, the wood elements being wood chips;
wherein the first mixture and the second mixture comprise at least 50% volume of the wood element to form the first board and the second board from a perspirant material;
wherein the first board has a smaller thickness than the thickness of the second board in the first direction; and
wherein the third intermediate board is only fixed to one of the first board and the second board, and the third intermediate board has a Young's modulus lower than or equal to 50% of the Young's modulus of the one of the first board and the second board.

10. A panel for a floor or wall comprising:
a first board made from a first mixture comprising a mortar in which wood elements are sunk;
a second board made from a second mixture comprising a mortar in which wood elements are sunk;
an intermediate third board placed between the first and second boards in a first direction, the intermediate third board comprising a thermal insulating material, the intermediate third board being a perspirant board;
punctiform fixing elements configured to fasten the first board, the second board and the intermediate third board to one another and to allow expansion of the first board with respect to the second board in a direction perpendicular to the first direction, the intermediate third board being fixed only to the first board or to the second board or joining the first board to the second board and deforming to allow expansion of the first board with respect to the second board in a direction perpendicular to the first direction;
wherein with respect to the total mass of the wood elements, the first and second boards comprise between 80% and 95% of the wood elements having a length comprised between 10 and 60 mm, the wood elements being wood chips;
wherein the first mixture and the second mixture comprise at least 50% volume of the wood element to form the first board and the second board from a perspirant material;
wherein the first board has a smaller thickness than the thickness of the second board in the first direction; and
wherein the third intermediate board and a spacer are fixed to one of the first board and the second board, the spacer having a thickness greater or equal to a thickness of the third intermediate board so as to prevent deformation of the third intermediate board along the first direction.

11. A panel for a floor or wall comprising:
a first board made from a first mixture comprising a mortar in which wood elements are sunk;
a second board made from a second mixture comprising a mortar in which wood elements are sunk;
an intermediate third board placed between the first and second boards in a first direction, the intermediate third board comprising a thermal insulating material, the intermediate third board being a perspirant board;
punctiform fixing elements configured to fasten the first board, the second board and the intermediate third board to one another and to allow expansion of the first board with respect to the second board in a direction perpendicular to the first direction, the intermediate third board being fixed only to the first board or to the second board or joining the first board to the second board and deforming to allow expansion of the first board with respect to the second board in a direction perpendicular to the first direction;
wherein with respect to the total mass of the wood elements, the first and second boards comprise between 80% and 95% of the wood elements having a length comprised between 10 and 60 mm, the wood elements being wood chips;
wherein the first mixture and the second mixture comprise at least 50% volume of the wood element to form the first board and the second board from a perspirant material;
wherein the first board has a smaller thickness than the thickness of the second board in the first direction; and
wherein the first board and the second board rest on a first slab, wherein the second board has a height lower than a height of the first board and wherein a second slab rest on the second board, the second slab facing the first board in a direction parallel to the first direction.

12. A method for manufacturing a panel, comprising:
providing a first board made from a first mixture comprising a mortar in which wood elements are sunk;
providing a second board made from a second mixture comprising a mortar in which wood elements are sunk;
providing an third intermediate board placed between the first and second boards in a first direction, the intermediate third board comprising a thermal insulating material, the intermediate third board being a perspirant board;
assembling the intermediate third board between the first board and the second board;
placing a spacer in contact against the first and second boards;
wherein with respect to the total mass of the wood elements, the first and second boards comprise between 80% and 95% of the wood elements having a length comprised between 10 and 60 mm, the wood elements being wood chips;
wherein the first mixture and the second mixture comprise at least 50% volume of the wood element to form the first board and the second board from a perspirant material; and
wherein the first board has a smaller thickness than the thickness of the second board in the first direction.

13. The method according to claim 12, comprising, after assembling, screwing a screw passing through the first board and the intermediate third board and screwed partially into the second board.

14. The method according to claim 12, wherein providing the first board, providing the second board and providing the intermediate third board comprises manufacturing the first board, manufacturing the intermediate third board on the first board, and manufacturing the second board on the intermediate third board.

\* \* \* \* \*